(12) United States Patent
Chen

(10) Patent No.: US 7,066,612 B2
(45) Date of Patent: Jun. 27, 2006

(54) MAGNETIC BOOT MODULE

(76) Inventor: Fu-Jeng Chen, 4F-1, No. 5, Lane 250, Sec. 5, Nan Ching E. Rd., Taipei (TW)

( * ) Notice: Subject to any disclaimer, the term of this patent is extended or adjusted under 35 U.S.C. 154(b) by 148 days.

(21) Appl. No.: 10/916,911

(22) Filed: Aug. 11, 2004

(65) Prior Publication Data

US 2005/0253023 A1 Nov. 17, 2005

(30) Foreign Application Priority Data

May 5, 2004 (TW) .............................. 93112670 A

(51) Int. Cl.
*G02B 7/182* (2006.01)
(52) U.S. Cl. ...................... 359/872; 359/877; 335/285; 335/289
(58) Field of Classification Search ................ 359/872, 359/876, 877, 881; 335/285, 289, 290
See application file for complete search history.

(56) References Cited

U.S. PATENT DOCUMENTS 4,362,362 A * 12/1982 Usami et al. ............... 359/874
4,449,788 A * 5/1984 Suzuki ....................... 359/873
4,906,089 A * 3/1990 Biondi et al. ............... 359/843

* cited by examiner

*Primary Examiner*—Ramon M. Barrera
(74) *Attorney, Agent, or Firm*—Pro-Techtor Int'l Services

(57) ABSTRACT

A magnetic boot module is described. The magnetic boot module has a pair of magnetic boots, a pair of moving devices, and a magnetic inductive path. Each of the moving devices couples to one of the magnetic boots to transversely push the magnetic boots moving on the magnetic inductive path step by step. The magnetic inductive path is formed on a magnetic inductive plate or a magnetic inductive rail. The magnetic boot module further utilizes a position detecting device to sense a current position thereof.

20 Claims, 6 Drawing Sheets

MAGNETIC BOOT MODULE

BACKGROUND OF THE INVENTION

1. Field of Invention

The invention relates to a magnetic boot module and, in particular, to a magnetic boot side mirror.

2. Related Art

In the past century, the vehicle industry has made a great progress. As the production techniques and materials improve, the vehicles are becoming much better. The prosperity of the vehicle industry also induces the advances in related fields. However, high-end sedans and sports utility vehicles or ordinary cars always emphasize on the same issues, i.e., safety and comfort. Therefore, the development of the vehicle industry does not only rely on its own techniques, but also on the progress in the related fields.

The safety of vehicles is the most important factor considered by designers, manufacturers, and drivers. In a moving vehicle, the driver often has to use the side mirrors to check the back in addition to simply watching the front through the windshield. Thus, the side mirrors play an important role in the driving safety.

The conventional electric side mirrors are driven by devices such as motors and gears to rotate the mirrors to desired angles for the driver. Nonetheless, this mechanism becomes inappropriate for the digitalized vehicle industry nowadays. Therefore, how to provide an electric side mirror in order to efficiently and conveniently control the angles of the side mirrors is an issue of great consequence. They should increase the driving safety and speed up the vehicle industry digitalization.

SUMMARY OF THE INVENTION

In view of the foregoing, the conventional electric side mirror structure is not suitable for the modem digitalized vehicle industry. It is highly desirable to provide a convenient and efficient device for controlling the side mirrors that enables the driver to easily adjust the side mirrors. In addition to the increased driving safety, the invention can further combine with the digitalized control technique for the side mirrors to reach the best working angles and positions.

An objective of the invention is to utilize a magnetic boot module to effectively control the angle and position of a side mirror, so that the driver can obtain a better field of vision to avoid accidents.

Another objective of the invention is to utilize an angle-adjusting magnetic boot module to reduce the required number of magnetic boots for adjusting the side mirrors.

A further objective of the invention is to utilize an inductive device and the positioning marks on the magnetic inductive path to confirm the angles of the side mirrors. This can increase the ability in the digital control of the side mirror. A fixing device is used to secure the side mirror and to prevent vibrations, thus increasing its stability.

Yet another objective of the invention is to utilize a magnetic boot module to accurately move a control device, increasing the precision of its motion.

According to the above objectives, the invention is a magnetic boot module that contains a first magnetic boot, a second magnetic boot, a first moving device, a second moving device, and a magnetic inductive path. The first magnetic boot and the second magnetic boot are installed in parallel. The first moving device couples to the first magnetic boot, and the second moving device to the second magnetic boot. Thus, the first magnetic boot and the second magnetic boot move on the magnetic inductive path step by step.

The first magnetic boot and the second magnetic boot are attracted to adhere onto the magnetic inductive path step by step. When the first magnetic boot is attracted to adhere onto the magnetic path, the first moving device pushes the first magnetic boot so that both the magnetic path and the first magnetic boot move a first predetermined distance. When the second magnetic boot is attracted to adhere onto the magnetic path, the second moving device pushes the second magnetic boot so that both the magnetic path and the first magnetic boot move a second predetermined distance.

Another embodiment of the invention is a magnetic boot side mirror. The magnetic boot side mirror contains a side mirror, a connection device, a magnetic inductive plate, and a magnetic boot module. The connection device couples to the back of the side mirror. The change in the relative positions of the magnetic boot module and the magnetic inductive plate brings the magnetic inductive plate and the connection device into motion to adjust the angle of the side mirror. The magnetic boot module contains at least two magnetic boots that move step by step to push the magnetic inductive plate.

The magnetic boot module can also couple to a magnetic inductive rail. Motion of the magnetic boot module on the magnetic inductive rail pushes the connection device to adjust the angle of the side mirror.

The magnetic inductive plate is made of a soft magnetic material, such as iron, nickel, cobalt, permalloy, supermalloy, and their combinations. The magnetic boot module further contains a position detecting device in order to determine the angle of the side mirror. It can combine with several positioning marks for the convenience of determining the angle of the side mirror.

A fixing pad is inserted between the magnetic inductive plate and the magnetic boot module. Once the side mirror reaches the predetermined angle, the fixing pad is depressed to touch the magnetic inductive plate to effectively fix the side mirror. The magnetic boot is also simultaneously attracted to adhere onto the magnetic inductive plate to further fix the side mirror.

The magnetic inductive plate or the magnetic inductive rail can be made of non-magnetic conductive materials, but is embedded with several magnetic inductive regions. Each magnetic inductive region is made of a soft magnetic material, such as iron, nickel, cobalt, permalloy, supermalloy, and their combinations. Each magnetic boot contains a moving device to transversely push the magnetic boot.

Another embodiment of the invention is a magnetic boot two-dimensional (2D) barcode reading device. The magnetic boot 2D barcode reading device contains a control device, a monitoring lens, a scanning lens, and a magnetic boot module. The magnetic boot 2D barcode reading device uses the monitoring lens to read an optimal reading position on a 2D barcode, and uses the control device and the magnetic boot module to push the scanning lens to the optimal reading position. This can effectively enhance the successful reading probability of the 2D barcode, thereby increasing the yield.

The disclosed magnetic boot module move the magnetic boots step by step on the magnetic inductive plate or the magnetic inductive rail, thereby actuating the connection device to adjust the angle of the side mirror. This does not enable the driver to easily adjust the angle of the side mirror, the detecting device therein further helps determining the current angle of the side mirror. The attraction of the magnetic boots increases the stability of the side mirror. The fixing pad further absorbs vibrations of a moving vehicle, ensuring the driving safety. The disclosed magnetic boot module can increase the reading efficiency of the 2D barcode reading device and provide necessary motions required for precision position adjustments. It can also be used in toy track cars.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

Not only can the invention facilitate the angle and position adjustments of the side mirrors, it can enhance the digital control of the side mirrors to ensure the driving safety. It can further be applied to two-dimensional (2D) barcode reading devices or toy track cars.

Figure 1:
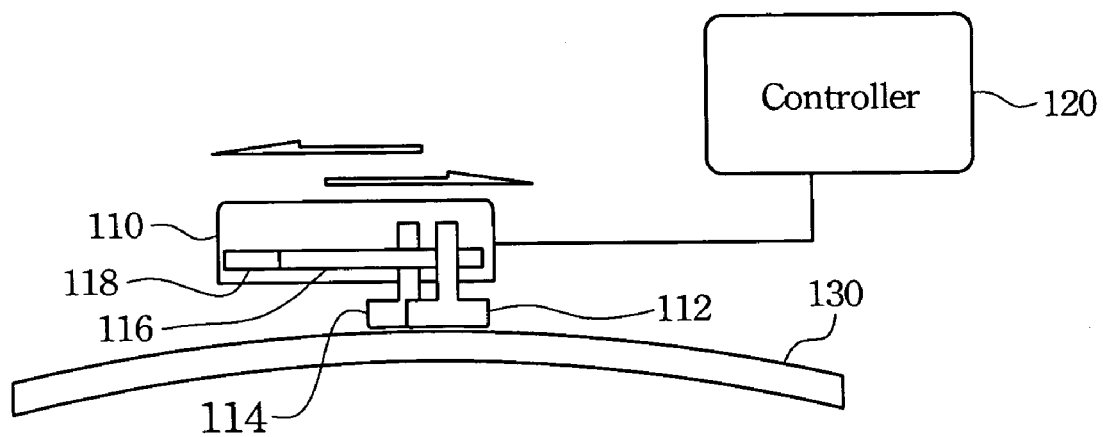
FIG. 1 is a schematic view of the disclosed magnetic boot module.

With reference to FIG. 1, the disclosed magnetic boot module contains a first magnetic boot 112 and a second magnetic boot 114 coupled from the back to a first moving device 116 and a second moving device 118, respectively. All of them are installed inside a case 110. The first magnetic boot 112 and the second magnetic boot 114 are coupled to a magnetic inductive path 130 through electromagnetic forces. The control signal from a controller 120 enables the first magnetic boot 112 and the second magnetic boot 114 to move on the magnetic inductive path 130. Relatively speaking, the change in the relative positions of the first magnetic boot 112 and the second magnetic boot 114 makes the magnetic inductive path 130 move in a predetermined direction.

When one wants to move the magnetic inductive path 130 to the left of the drawing, the controller 120 first sends out a signal for the first magnetic boot 112 to be attracted to adhere onto the magnetic inductive path 130. The first moving device 116 simultaneously moves the first magnetic boot 112 and the magnetic inductive path 130 to the left by a predetermined distance. Afterwards, the second magnetic boot 114 is attracted to adhere onto the magnetic inductive path 130. The first moving device 118 simultaneously moves the first magnetic boot 114 and the magnetic inductive path 130 to the left by the predetermined distance. At the same time the second magnetic boot 114 is attracted to the magnetic inductive path 130, the controller 120 sends out a signal to remove the magnetism on the first magnetic boot 112, departing it from the magnetic inductive path 130. The first moving device 116 moves the first magnetic boot 112 to the right, back to its initial position.

The controller 120 repeats the above steps to achieve the required moving distance for the magnetic inductive path 130. The first magnetic boot 112 and the second magnetic boot 114 move step by step so that the magnetic inductive path 130 can move transversely to the right to the required position. The first moving device 116 and the second moving device 118 can be electromagnetic moving devices or mechanical moving devices without departing from the spirit of the invention.

Figure 2:
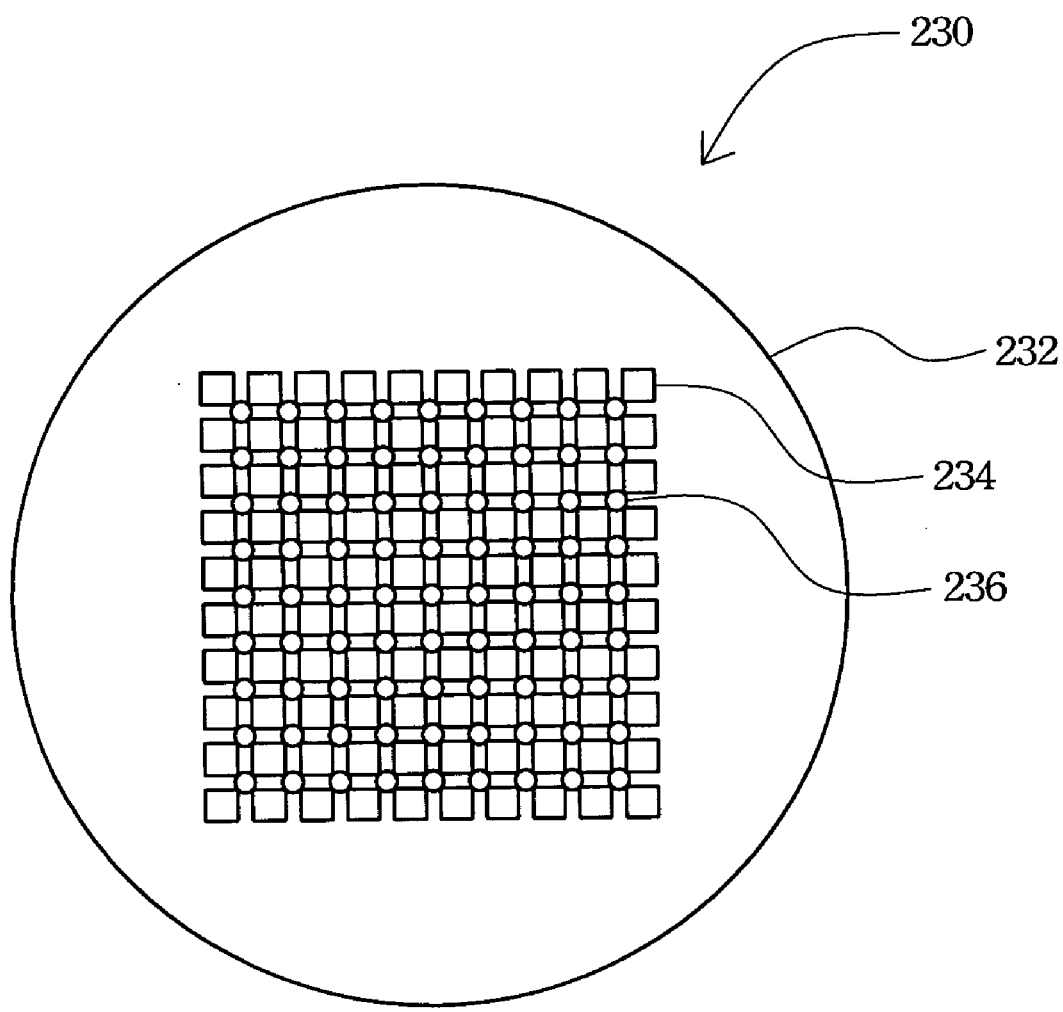
FIG. 2 is a schematic view of a preferred embodiment of the magnetic inductive plate in the invention.

FIG. 2 shows a preferred embodiment of the disclosed magnetic inductive plate.

As shown in the drawing, the magnetic inductive plate 230 is formed from a base plate 232. The base plate 232 can be made of a soft magnetic conductive material, such as iron, cobalt, nickel, permalloy, supermalloy, or any temporary magnetic material. The magnetic inductive plate thus made is used for the magnetic boots in FIG. 1 to adhere onto.

The base plate 232 can also be made of a non-magnetic conductive material, such as plastic or aluminum, in order to reduce the weight of the base plate 232. For the adhesion of the magnetic boots, the base plate 232 is embedded with several magnetic inductive regions 234 made of a magnetic conductive material, such as iron, cobalt, nickel, permalloy, supermalloy, or any temporary magnetic material. The magnetic conductive base plate 232 or magnetic inductive regions 234 form the magnetic conductive path of the magnetic boots.

The base plate 232 can be further provided with positioning marks 236 for positioning the angle of the side mirror. Its implementation will be described in subsequent embodiments.

Figure 3:
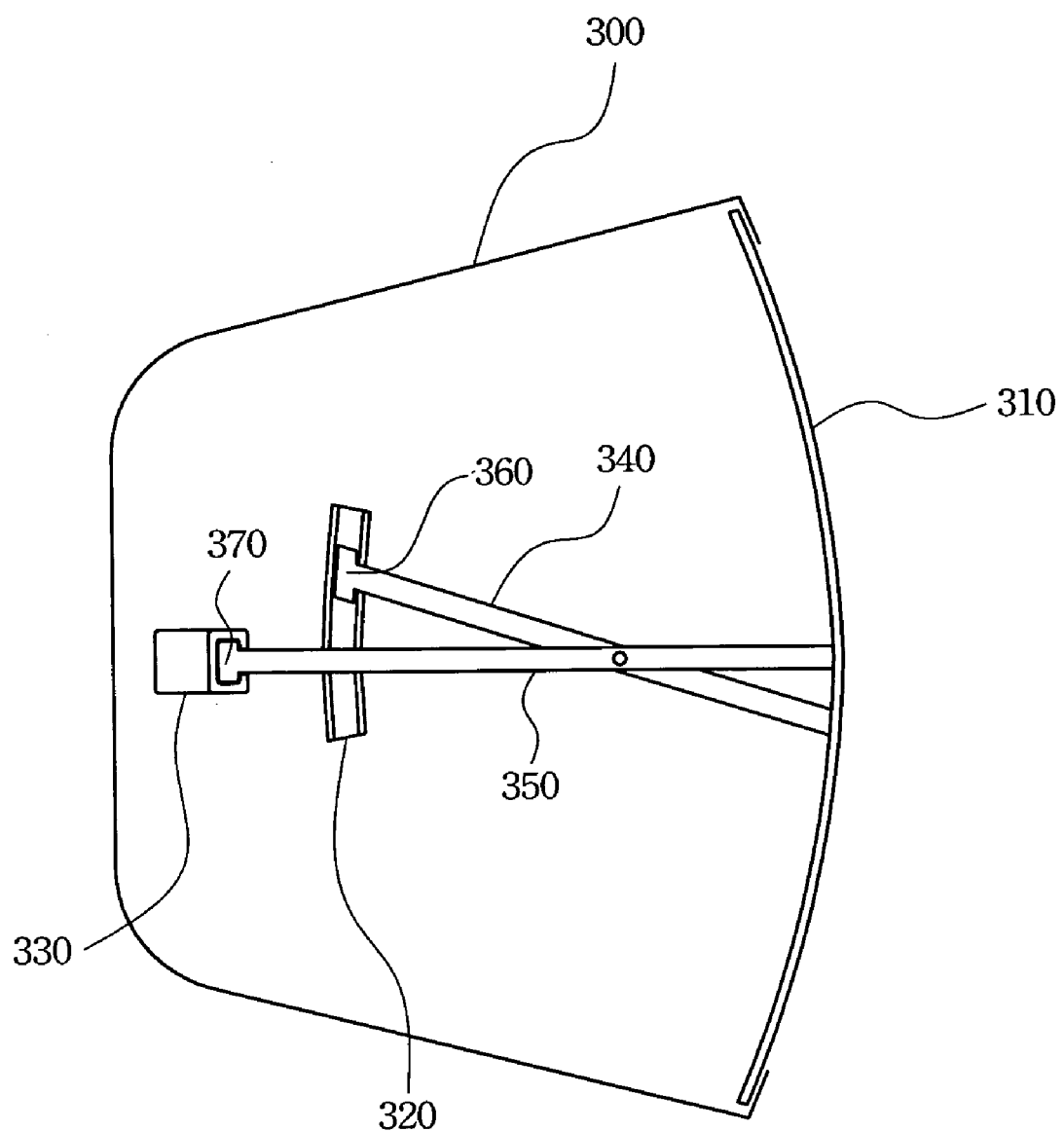
FIG. 3 is a schematic view of a first preferred embodiment of the invention.

In the first preferred embodiment of the magnetic boot side mirror, as shown in FIG. 3, the side mirror 300 contains a mirror 310, a first magnetic inductive track 320, a second magnetic inductive track 330, a first connection device 340, a second connection device 350, a first magnetic boot 360, and a second magnetic boot 370.

When rotating the mirror 310 of the side mirror 300, the first magnetic boot 360, the first connection device 340, and the first magnetic inductive track 320 enable the mirror 310 to rotate in the vertical direction. The second magnetic inductive track 330, the second connection device 350, and the second magnetic boot 370 enables the mirror 310 to rotate horizontally. Therefore, the side mirror of the first preferred embodiment allows the driver to adjust the angle of the side mirror 310. The first magnetic inductive track 320 and the second magnetic inductive track 330 provide the magnetic inductive paths for the first magnetic boot 360 and the second magnetic boot 370, respectively. The magnetic inductive paths of the first magnetic inductive track 320 and the second magnetic inductive track 330 also contain positioning marks for determining the angle of the side mirror 310. The first magnetic inductive track 320 and the second magnetic inductive track 330 can be made of a soft magnetic conductive material, such as iron, cobalt, nickel, permalloy, supermalloy, and any temporary magnetic material. They can also be made of a non-magnetic conductive material, such as plastic and aluminum, to reduce the weight of the tracks. In order for the magnetic boot to adhere, the tracks are embedded with several magnetic inductive regions made of a magnetic conductive material.

Figure 4:
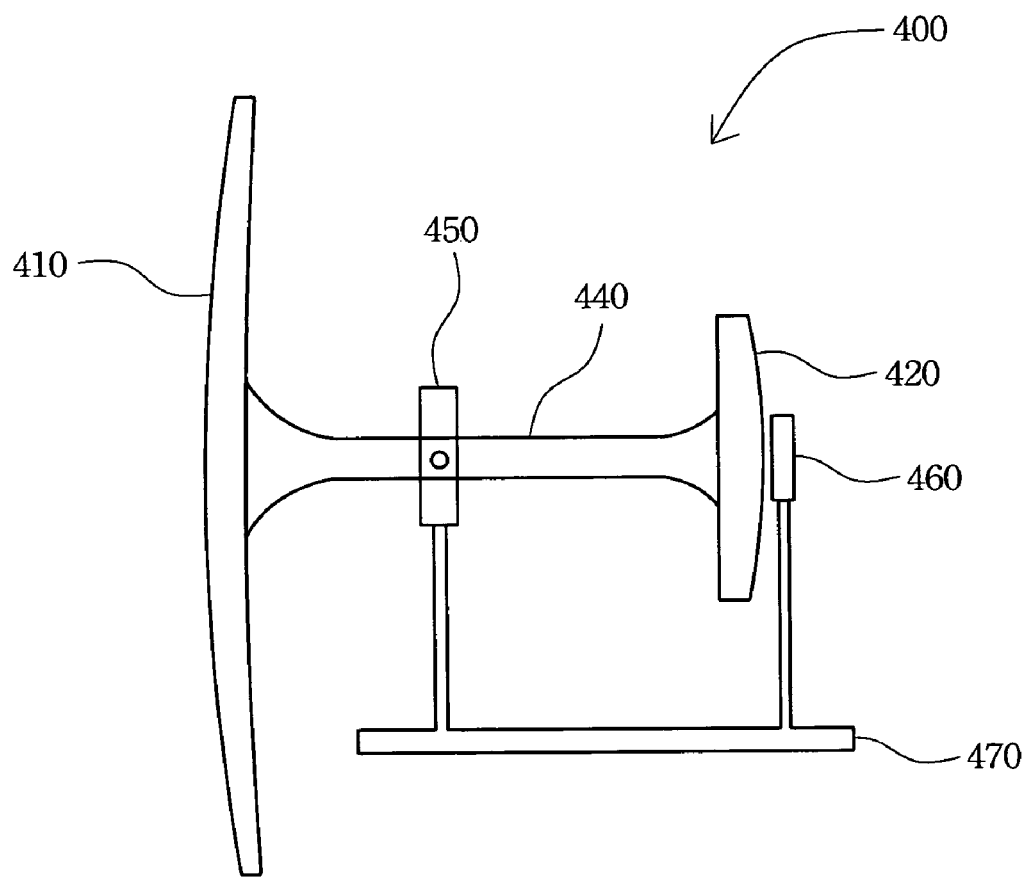
FIG. 4 is a schematic view of a second preferred embodiment of the invention.

FIG. 4 shows a second embodiment magnetic boot side mirror using the disclosed magnetic boot module. As shown in the drawing, the side mirror 400 contains a mirror 410, a magnetic inductive plate 420, a connection device 440, a rotating device 450, a magnetic boot module 460, and a fixing base 470.

The magnetic boot module 460 moves the magnetic inductive plate 420 both vertically and horizontally. One end of the connection device 440 is coupled to the magnetic inductive plate 420. The other end is coupled to the mirror 410. Through the motion of the magnetic inductive plate 420, the connection device 440 transmits the corresponding displacement to the mirror 410 to change its angle. One end of the rotating device 450 is coupled to the fixing base 470 to provide the rotation required by the connection device 440. Once the magnetic boot module 460 moves the magnetic inductive plate 420, the mirror 410 can be rotated to the angle required by the driver.

Figure 5:
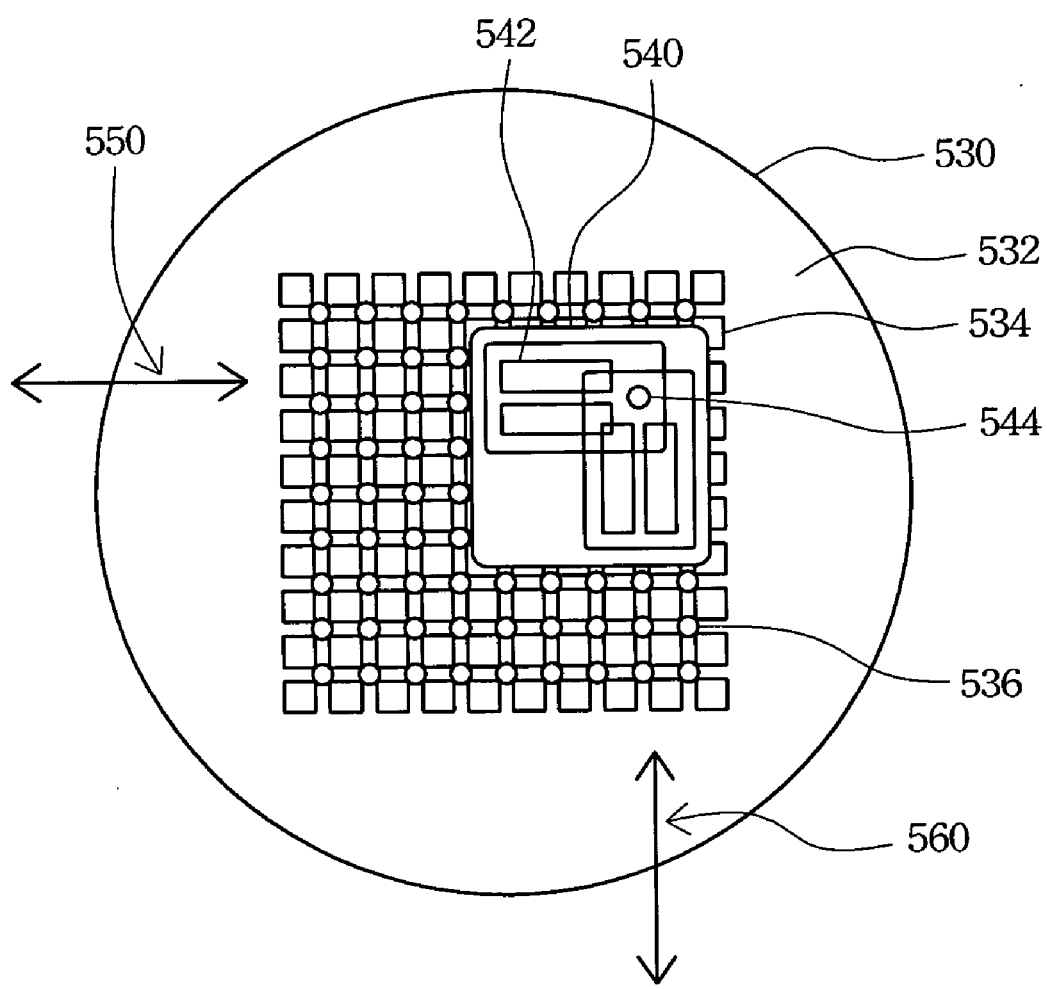
FIG. 5 is a schematic view of the magnetic boot module and the magnetic inductive plate in FIG. 4.

FIG. 5 is a schematic view of the second preferred embodiment magnetic boot module and magnetic inductive plate in FIG. 4. The magnetic boot module 540 contains a magnetic boot 542 and a rotating axis 544. The rotating axis provides both the fixing and rotating functions. When adjusting the angle of the side mirror in the direction 550, the magnetic boot 542 rotates by the rotating axis 544 until it is parallel to the direction 550. Using the magnetic boot 542, the magnetic inductive plate 530 moves along the direction 550. When adjusting the angle of the side mirror in the direction 560, the magnetic boot 542 rotates by the rotating axis 544 until it is parallel to the direction 560. Using the magnetic boot 542, the magnetic inductive plate 530 moves along the direction 560. Therefore, the magnetic boot module 540 only needs a set of magnetic boot 542 to achieve the goal of rotating the magnetic inductive plate 530, thereby rotating the side mirror to the desired angle.

The rotating axis 544 further contains a position detecting device therein for reading the positioning marks 536 on the base plate 532 of the magnetic inductive plate 530. The positioning marks 536 help clearly determining the current angle of the side mirror and adjusting the side mirror to the required angle. The magnetic inductive regions 534 can effectively reduce the weight of the whole magnetic inductive plate 530.

The magnetic boot module 540 can make the magnetic boot adhere onto the magnetic inductive plate 530 to further fix the side mirror after it is rotated to the required angle. A fixing pad is provided under the magnetic boot module 540 where it is in touch with the magnetic inductive plate 530. Once the side mirror is rotated to the required angle, the fixing axis 544 rotates to press down, bringing the fixing pad and the magnetic inductive plate 530 in touch with each other. It can effectively absorb the vibrations of the vehicle in motion to secure the side mirror.

The disclosed magnetic boot module can combine with a device that automatically adjusts the angle of the side mirror to increase the driving safety. From the adjustment record of the driver, the disclosed magnetic boot module can automatically the preferred side mirror angles for individual drivers.

The disclosed magnetic boot module does not only facilitate the angle adjustment of the side mirror to increase the driving safety, it further provides a digitalized adjustment method to enhance the vehicle digital controls. Moreover, the driving safety and convenience will be greatly improved if the angle of the side mirror can be automatically adjusted as the vehicle makes turns or according to the driver's needs.

Figure 6:
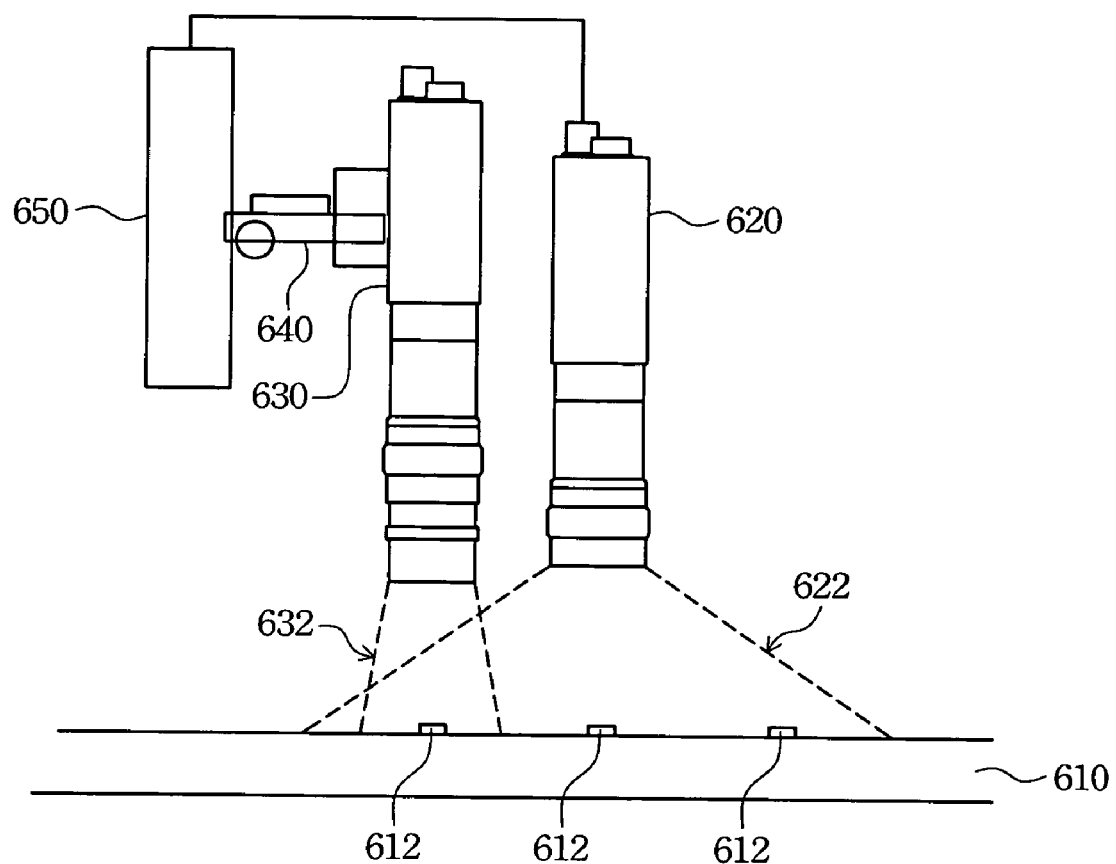
FIG. 6 is a third preferred embodiment of the disclosed magnetic boot module.

In FIG. 6, we show a third preferred embodiment of the 2D barcode reading device using the disclosed magnetic boot module. As shown in the drawing, the magnetic boot module 640 is installed between a control device 650 and a scanning lens 630. This embodiment uses a monitoring lens 620 to read the relative positions of the 2D barcode 612 of a substrate 610. The control device 650 adjusts the reading position of the scanning lens 630 in order to accurately read the 2D barcode 612 on the substrate 610. In the manufacturing process, the 2D barcode 612 has a very small dimension, generally between 0.8 mm to 2.5 mm. Therefore, when reading the data on the 2D barcode, the scan range 632 of the scanning lens 630 can effectively cover the 2D barcode 612. Since the 2D barcode has a very small area and one often adopts a run-scan means to increase the efficiency of a production line, the probability of reading failure thus increases. This kind of reading errors is often due to the errors associated with the transmission mechanism that result in imprecise barcode positions.

In order to effectively avoid such barcode reading failure and low production yields, this embodiment uses a monitoring lens 620 to monitor the substrate 610. It has a large monitoring range 622 in order to provide precise positioning of the scanning lens 640. The reading success rate of the scanning lens 630 can thus be increased.

We only show preferred embodiments of the disclosed magnetic boot module in the above descriptions. However, the invention is not limited to the described side mirrors or 2D barcode reading devices. The disclosed magnetic boot module can be further used in any mechanism that requires precision position adjustments or calibrations. It can also be used in toy track cars. One only needs to adjust he duration and number of times to magnetize the magnetic boots in the disclosed magnetic boot module for controlling the moving distance and precision of the magnetic boots. As the magnetization duration shortens, the magnetic boots can make more precise moves. Moreover, the moving distance of the magnetic boots can increase with the number of magnetization times.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A magnetic boot module comprising:
   a first magnetic boot;
   a second magnetic boot, which is installed parallel to the first magnetic boot;
   a first moving device, which is coupled to the first magnetic boot;
   a second moving device, which is coupled to the second magnetic boot;
   a controller, which is coupled to the first magnetic boot, the second magnetic boot, the first moving device, and the second moving device; and
   a magnetic inductive path;
   wherein the first magnetic boot and the second magnetic boot are attracted to adhere onto the magnetic inductive path, and the controller makes the first moving device and the second moving device to move the first magnetic boot and the second magnetic boot, respectively, step by step on the magnetic inductive path.

2. The magnetic boot module of claim 1, wherein the magnetic inductive path is a magnetic inductive plate.

3. The magnetic boot module of claim 2, wherein the magnetic inductive plate is made of a soft magnetic material.

4. The magnetic boot module of claim 2, wherein the magnetic inductive plate is made of a non-magnetic conductive material and contains a plurality of magnetic inductive regions formed using a soft magnetic material.

5. The magnetic boot module of claim 1, wherein the magnetic inductive path is a magnetic inductive rail made of a soft magnetic material.

6. The magnetic boot module of claim 1 further comprising a position detecting device for determining the position of the magnetic boot module and the magnetic inductive path.

7. A magnetic boot side mirror comprising:
- a side mirror;
- a connection device, which is coupled to the back of the side mirror;
- a magnetic inductive plate, which is coupled to the connection device; and
- a magnetic boot module, which contains at least two magnetic boots that walks on the magnetic inductive plate, thereby moving the magnetic inductive plate and the connection device to adjust the angle of the side mirror.

8. The magnetic boot side mirror of claim 7, wherein the magnetic inductive plate is made of a soft magnetic material.

9. The magnetic boot side mirror of claim 8, wherein the soft magnetic material is selected from the group consisting of iron, nickel, cobalt, permalloy, supermalloy, and their combinations.

10. The magnetic boot side mirror of claim 7 further comprising a rotating axis for the magnetic boot module to change its proceeding direction.

11. The magnetic boot side mirror of claim 10, wherein the rotating axis further contains a position detecting device to determine the current angle of the side mirror.

12. The magnetic boot side mirror of claim 11, wherein the magnetic inductive plate further contains a plurality of positioning marks for the position detecting device to determine the current angle of the side mirror.

13. The magnetic boot side mirror of claim 10, wherein the fixing axis further contains a fixing pad that is depressed by the rotating axis to touch the magnetic inductive plate when the side mirror reaches a predetermine angle so as to effectively secure the side mirror.

14. The magnetic boot side mirror of claim 7, wherein the magnetic inductive plate is made of a non-magnetic conductive material.

15. The magnetic boot side mirror of claim 14, wherein the magnetic inductive plate contains a plurality of magnetic inductive regions formed thereon.

16. The magnetic boot side mirror of claim 15, wherein each of the magnetic inductive regions is made of a soft magnetic material.

17. The magnetic boot side mirror of claim 16, wherein the soft magnetic material is selected from the group consisting of iron, nickel, cobalt, permalloy, supermalloy, and their combinations.

18. The magnetic boot side mirror of claim 7, wherein each of the magnetic boots further contains a moving device to move the corresponding magnetic boot in its transverse direction.

19. The magnetic boot side mirror of claim 7, wherein the magnetic boot is attracted to adhere onto the magnetic inductive plate to effectively secure the side mirror once the side mirror reaches a predetermined angle.

20. The magnetic boot side mirror of claim 7, wherein the connection device further contains a rotating device for the connection device to rotate.

* * * * *